United States Patent [19]
Tamhankar et al.

[11] Patent Number: 5,620,501
[45] Date of Patent: Apr. 15, 1997

[54] RECOVERY OF TRACE GASES FROM GAS STREAMS

[75] Inventors: Satish S. Tamhankar, Scotch Plains; Ramakrishnan Ramachandran, Allendale, both of N.J.

[73] Assignee: The BOC Group, Inc., New Providence, N.J.

[21] Appl. No.: 515,444

[22] Filed: Aug. 15, 1995

[51] Int. Cl.$^6$ ............................................. B01D 53/053
[52] U.S. Cl. .................... 95/92; 95/96; 95/142; 95/147; 96/108; 96/143
[58] Field of Search ................ 95/95–106, 142, 95/143, 147, 92–94, 141; 96/108, 115, 130, 135, 136, 144

[56] References Cited

U.S. PATENT DOCUMENTS

| | | | |
|---|---|---|---|
| 3,142,547 | 7/1964 | Marsh et al. | 95/100 |
| 3,564,816 | 2/1971 | Batta | 95/100 |
| 3,788,036 | 1/1974 | Leo et al. | 96/130 X |
| 3,796,022 | 3/1974 | Simonet et al. | 95/96 |
| 4,013,429 | 3/1977 | Sircar et al. | 95/101 |
| 4,360,362 | 11/1982 | Asztalos | 95/96 X |
| 4,534,346 | 8/1985 | Schlaechter | 95/102 X |
| 4,539,019 | 9/1985 | Koch | 95/96 X |
| 4,561,865 | 12/1985 | McCombs et al. | 95/96 |
| 4,599,094 | 7/1986 | Werner et al. | 95/101 |
| 4,816,039 | 3/1989 | Krishnamurthy et al. | 95/97 |
| 4,892,566 | 1/1990 | Bansal et al. | 95/98 |
| 4,948,391 | 8/1990 | Noguchi | 95/98 |
| 5,370,728 | 12/1994 | LaSala et al. | 95/101 |
| 5,417,742 | 5/1995 | Tamhankar et al. | 95/96 |

FOREIGN PATENT DOCUMENTS

| | | | |
|---|---|---|---|
| 0342877 | 11/1989 | European Pat. Off. | 95/96 |
| 3301993 | 7/1984 | Germany | 95/96 |

*Primary Examiner*—Robert Spitzer
*Attorney, Agent, or Firm*—Coleman R. Reap; Larry R. Cassett

[57] ABSTRACT

Selected strongly adsorbed gaseous impurities are removed from a gas stream by pressure swing adsorption in an adsorption system which includes a single adsorption vessel, a gas storage vessel and a single gas pump. Feed gas is pumped at a selected adsorption pressure cocurrently through the adsorption vessel, which contains an adsorbent that selectively adsorbs the selected impurity or impurities. The less strongly adsorbed components of the gas mixture pass out the adsorption vessel through the nonadsorbed gas outlet end of the adsorption vessel. When the adsorbed gas front reaches a certain point in the adsorption vessel, the adsorption step is terminated and gas is countercurrently transferred from the adsorption vessel to a gas storage vessel, optionally with use of the gas pump. The adsorption vessel is then countercurrently evacuated by use of the pump and a selected gas-enriched product is recovered and sent to storage or further processed in downstream treatment operations. Following bed regeneration, the adsorption vessel is partially repressurized by transferring gas from the storage vessel to the adsorption vessel, optionally with use of the pump, and then the adsorption vessel is pressurized to the selected adsorption pressure using the pump.

23 Claims, 1 Drawing Sheet

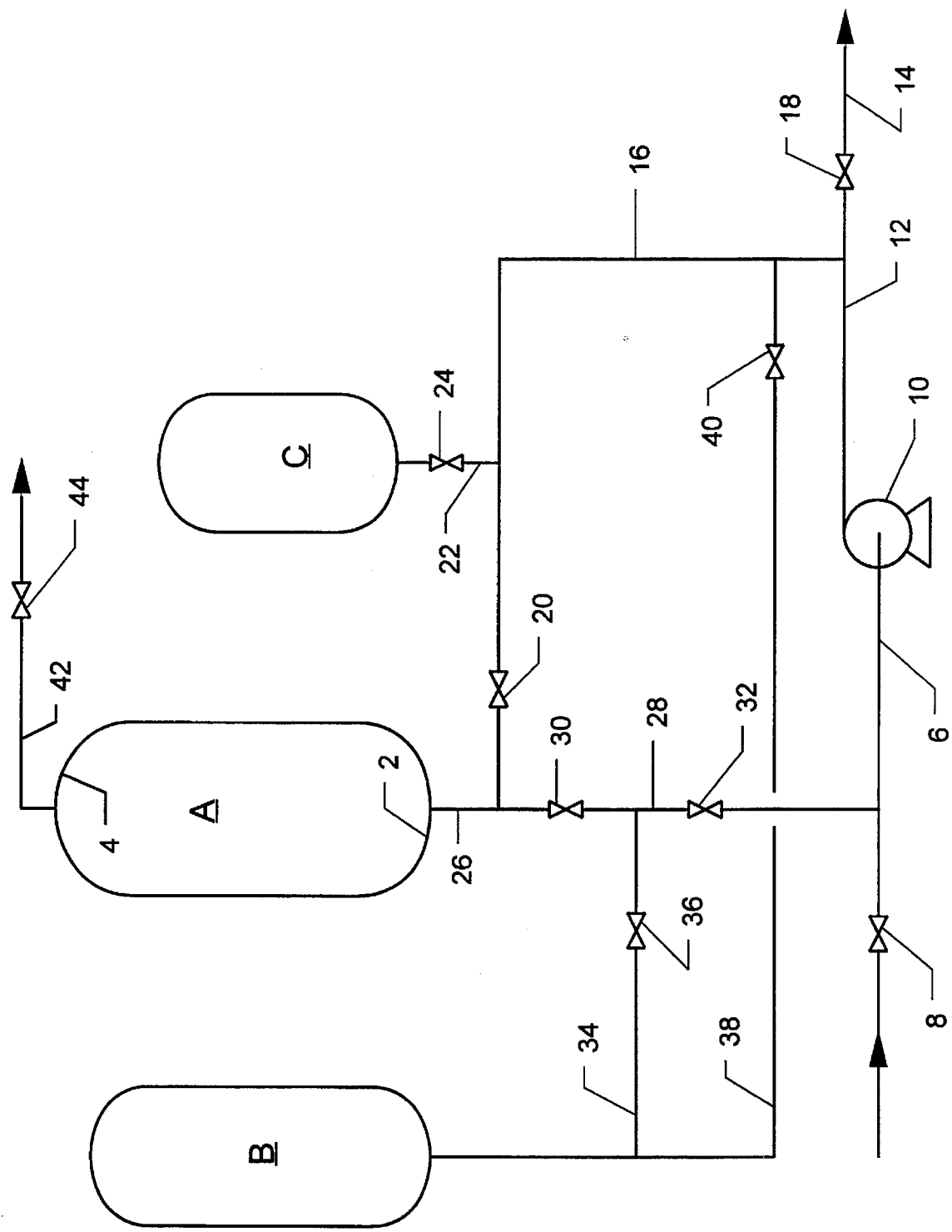

RECOVERY OF TRACE GASES FROM GAS STREAMS

FIELD OF THE INVENTION

This invention relates to the recovery of trace gases from gas streams, and more particularly to the recovery of strongly adsorbed environmentally objectionable trace gases from a gas stream prior to release of the gas stream to the atmosphere.

BACKGROUND OF THE INVENTION

Waste gases from industrial processes often contain small amounts of gas components that render the waste gases unsuitable for discharge to the environment. For example, waste gas streams from semiconductor fabrication processes comprise as major components inert gases, such as nitrogen, argon, but they also contain small amounts of fluorinated hydrocarbons, phosphine, silanes, etc. Similarly, waste gas streams from certain hydrocarbon processing plants mostly comprise gases that can be discharged to the atmosphere, such as carbon dioxide and nitrogen, but they frequently also contain small amounts of hydrocarbons, hydrocarbon derivatives or byproduct gases, such as carbon monoxide, that cannot be discharged to the environment.

Processes for the destruction of the environmentally objectionable gaseous impurities have long been available. Typical of such processes are combustion and catalytic oxidation processes. Such process are not, however, always effective for the destruction of the objectionable gas components. For instance fluorinated hydrocarbons, such as tetrafluoromethane and hexafluoroethane, cannot easily be destroyed by conventional combustion processes.

Even if processes for the destruction of these compounds were available, it is not always desirable to destroy the compounds because of their value. In such cases it is preferable to recover and recycle the trace gases.

Processes for the removal of trace gases from waste gas streams are well known. Among the known techniques is adsorptive separation. It is known to purify gas streams by passing the gas streams through adsorbents which more strongly adsorb the impurity than the other components of the gas stream. Typical of known adsorption processes for purifying gas streams is U.S. Pat. No. 5,417,742, issued to Tamhankar et al, which discloses the removal of perfluorocarbons from gas streams by pressure swing adsorption (PSA) or temperature swing adsorption (TSA) using certain adsorbents which selectively adsorb the fluorocarbons.

Equipment configurations for the adsorption of components from gas streams are generally complex and costly, and usually comprise two or more adsorption vessels and two or more pumps to transfer the various gas streams associated with such processes. Less complex equipment configurations, such as those having one adsorption vessel are known. For example, U.S. Pat. No. 5,370,728, issued to LaSala et al, discloses a single vessel PSA system for separating air into oxygen and nitrogen. A void space gas tank located on the nonadsorbed gas outlet end of the system is used to receive and hold void space gas from the adsorption vessel while the vessel is being evacuated. Upon completion of the evacuation step, the vessel is partially repressurized by returning the void space gas into the vessel via its nonadsorbed gas outlet. This patent also discloses the use of the same pump to both charge feed air into the vessel and to evacuate the vessel. U. S. Pat. Nos. 4,561,865 and 4,948,391, issued to McCombs et al and Noguchi, respectively, disclose single adsorption vessel PSA systems which have a gas reservoir on their nonadsorbed gas outlet ends to hold gas for purging and/or partially repressurizing the adsorption vessel. The Noguchi patent also discloses the use of a gas reservoir to hold feed gas. Although these patents provide simplified one-vessel adsorption systems, these systems would not be suitable for removing strongly adsorbed components from gas streams where it is highly desirable to produce a nonadsorbed gas product that is substantially free of the strongly adsorbed gas, since residual strongly adsorbed gas will remain in the nonadsorbed gas conduits after the void space gas is returned to the adsorption vessel.

Methods and equipment configurations which can be used to remove trace components from waste gas streams so that the waste gas stream can be discharged into the atmosphere, are continually sought. The present invention provides an efficient method and a compact and relatively inexpensive single adsorption vessel system for efficiently removing strongly adsorbed trace gases from gas streams on an intermittent basis.

SUMMARY OF THE INVENTION

The present invention accomplishes the goal of storing void space gas during evacuation of a single adsorption vessel system and partially repressurizing the vessel with the stored void space gas without danger of adulterating the nonadsorbed product gas with residual strongly adsorbed gas component by providing a void space gas storage reservoir that removes void space gas from the adsorption vessel and returns it to the adsorption vessel through the feed gas inlet end of the vessel.

A first embodiment of the invention comprises apparatus for separating a strongly adsorbed gas from a gas mixture comprising:

(a) an adsorption vessel having at opposite ends a feed inlet and a nonadsorbed gas outlet and which contains an adsorbent which selectively adsorbs the strongly adsorbed gas from the gas mixture;

(b) a gas storage vessel connected by a conduit to the inlet end of the adsorption vessel, the conduit having a valve to control the passage of gas between the adsorption vessel and the gas storage vessel;

(c) a pump for charging feed gas into said adsorption vessel and for evacuating gas from the adsorption vessel, the inlet end of the pump being connected by a pump inlet conduit to both a source of feed gas and the feed inlet end of the adsorption vessel, and the outlet end of the pump being connected by a pump outlet conduit to both a desorbed gas discharge line and to the feed inlet end of the adsorption vessel;

(d) a conduit having a valve and connecting the nonadsorbed gas outlet end of the adsorption vessel to a nonadsorbed gas discharge line;

(i) one or more valves associated with the pump inlet conduit for selectively providing fluid communication between the pump inlet and either the source of feed gas or the inlet end of the adsorption vessel; and (j) one or more valves associated with the pump outlet conduit for selectively providing fluid communication between the pump outlet and either the inlet end of the adsorption vessel or the desorbed gas discharge line.

In a preferred aspect of this embodiment, the pump outlet is additionally connected to the gas storage vessel by a conduit which contains a valve, and the pump inlet is connected to the gas storage vessel by a conduit which contains a valve. In another preferred aspect of this embodiment, a feed gas buffer tank is connected to the line connecting the pump outlet to the inlet to the adsorption vessel.

A second embodiment comprises a pressure swing adsorption process for recovering a gaseous impurity from a gas stream comprising repeatedly performing in sequence the following steps:

(a) charging the gas stream at a selected superatmospheric adsorption pressure into an adsorption system having only one adsorption vessel, the vessel containing an adsorbent which selectively adsorbs the gaseous impurity relative to the other components of the gas stream. As the gas passes cocurrently through the adsorption vessel, i.e. in the direction from the feed inlet end to the nonadsorbed gas outlet end, the gaseous impurity is adsorbed onto the adsorbent and a nonadsorbed gas fraction is discharged from the adsorption vessel through the nonadsorbed gas outlet end of the vessel;

(b) partially countercurrently depressurizing the single adsorption vessel, i.e. discharging gas from the adsorption vessel through its inlet end, and collecting the discharged gas in a gas storage vessel;

(c) further countercurrently depressurizing the single adsorption vessel, thereby discharging therefrom a gas product enriched in the gaseous impurity;

(e) partially pressurizing the adsorption vessel by cocurrently charging gas from the gas storage vessel into the adsorption vessel; and (f) further pressurizing the single adsorption vessel to the selected superatmospheric adsorption pressure by cocurrently charging fresh gas stream into the vessel.

In a preferred aspect of the second embodiment of the invention, part or all of step (b), above, is carried out by pumping gas from the adsorption vessel to the gas storage vessel. In another preferred aspect of this embodiment, part or all of step (e) is carried out by pumping gas from the gas storage vessel to the adsorption vessel. In a more preferred embodiment part or all of each of steps (b) and (e) is carried out by using a pump to transfer gas between the adsorption vessel and the gas storage vessel. In specific embodiment of the process of the invention, step (b) is carried by first letting gas flow from the adsorption vessel to the gas storage vessel without using a pump until the pressure in the two vessels is approximately equal, and then using a pump to transfer additional gas from the adsorption vessel to the gas storage vessel. In another specific embodiment, step (e) is carried by first letting gas flow from the gas storage vessel to the adsorption vessel without using a pump until the pressure in the two vessels is approximately equal, and then using a pump to transfer additional gas from the gas storage vessel to the adsorption vessel.

In another preferred aspect of the second embodiment, the same pump is used to charge feed gas into the adsorption vessel and to countercurrently evacuate the adsorption vessel. In another preferred aspect the same pump is used in steps (a), (c) and (f), above. In yet another preferred aspect the same pump is use in steps (a), (c) and (f), and in one or both of steps (b) and (e).

The adsorption step of the process is generally carried out at pressure in the range of about 1.1 to about 20 bara (bar, absolute), and in some instances it is preferred to conduct the adsorption step at a pressure in the range of about 1.5 to about 5 bara. The bed regeneration step is preferably carried out by countercurrently evacuating the adsorption vessel to subatmospheric pressure. In preferred embodiments, the adsorption vessel is evacuated to a pressure in the range of about 0.05 to about 0.8 bara, and in a more preferred embodiment, the adsorption vessel is evacuated to a pressure in the range of about 0.05 to about 0.5 bara.

In another preferred embodiment, feed gas is pumped into a feed gas reservoir, located in the feed gas line between the pump outlet and the adsorption vessel, during the step in which void space gas is countercurrently discharged to the gas storage vessel.

DETAILED DESCRIPTION OF THE DRAWING

The sole drawing FIGURE illustrates a single adsorption vessel system in which the process of the invention can be carried out.

DETAILED DESCRIPTION OF THE INVENTION

The process of the invention is a cyclic pressure swing adsorption process, and it is carried out in an adsorption system consisting of a single adsorption vessel. The system is efficiently used to recover small amounts of preferentially adsorbed gaseous components of a gas mixture by storing void space gas in a separate gas storage vessel while the adsorbent in the adsorption vessel is regenerated. By "void space gas" is meant the gas remaining in the void spaces between the adsorbent particles in the adsorption vessel at the end of the adsorption step. Upon completion of the adsorbent regeneration step, the stored void space gas is returned to the adsorption vessel to partially repressurize this vessel for the next adsorption step. The void space gas is removed from and returned to the adsorption vessel through the feed gas inlet end of the vessel.

The invention can be better understood from the accompanying drawing. Auxiliary equipment, including valves, compressors and heat exchangers, that is unnecessary for an understanding of the invention have been omitted from the drawing to simplify discussion of the invention.

The drawing illustrates an adsorption system comprising a single adsorption vessel A, a void space gas storage vessel, B and a feed gas reservoir, C. Vessel A is preferably cylindrical in shape and is provided with feed gas inlet end 2 and nonadsorbed gas outlet end 4. Vessel A contains an adsorbent which preferentially adsorbs one or more components of the gas being processed in the system relative to one or more other gases contained in the gas. Feed gas supply line 6, fitted with valve 8 is connected to the inlet end of pump 10. On its discharge end pump 10 is connected to line 12 which, in turn, is joined to desorbed gas discharge line 14 and to feed gas transfer line 16. Lines 14 and 16 are provided with valves 18 and 20, respectively. Line 22, fitted with valve 24 connects line 16 to feed gas reservoir C. Line 16, on its downstream end, is connected to adsorption vessel inlet line 26 and to evacuation line 28. Evacuation line 28 is provided with valves 30 and 32. Void space gas transfer line 34, provided with valve 36 connects void space gas vessel B to line 28 at a point between valves 30 and 32. Line 38, provided with valve 40, joins line 16, at a point upstream of valve 20, to line 34, at a point downstream of valve 36. Nonadsorbed gas discharge line 42, provided with valve 44, is connected to the nonadsorbed gas outlet end of vessel A.

The process of the invention can be practiced in the system illustrated in the drawing in several ways. According to one embodiment, void space gas is transferred between vessels A and B using the differential pressure between these vessels as the driving force; and pump 10 is used to supply feed gas to feed reservoir C and adsorption vessel A, and to evacuate gas from adsorption vessel A. Valve 40 remains closed throughout the entire cycle of this embodiment. At the beginning of the feed pressurization step, valves 8, 20 and 24 are open and all other valves are closed. Feed gas flows out of vessel C and into vessel A. Additional feed gas, drawn through line 6 by operation of pump 10, is charged into vessel A via lines 16 and 26. When the pressure in vessel A reaches the desired adsorption pressure, valve 44 is opened and feed gas flows through the bed of adsorbent in vessel A. As the feed gas passes through the bed the more strongly adsorbed component(s) are preferentially adsorbed and the less strongly adsorbed component(s) pass through the adsorbent and exit vessel A through line 42. This gas is disposed of in any suitable manner, for instance by discharge to the atmosphere, or it is stored or used in downstream process operations. As the adsorption step proceeds, an adsorbed gas front forms in vessel A and gradually advances toward nonadsorbed gas outlet end 4 of vessel A. When the adsorbed gas front reaches a predetermined point in vessel A, which is sufficiently remote from end 4 of vessel A to prevent breakthrough of the strongly adsorbed gas component out of vessel A through its nonadsorbed gas end, the adsorption step is terminated and the first depressurization step is begun.

In this embodiment, the first depressurization step is carried out by opening valves 30 and 36 and closing valves 20 and 44. Due to the pressure difference in vessels A and B, gas contained in the void spaces between the adsorbent in vessel A now flows countercurrently out of this vessel and into vessel B via lines 26 and 34. Meanwhile pump 10 continues to pump feed gas into feed gas reservoir C, thereby at least partially pressurizing this vessel with gas for the next adsorption cycle. When the desired quantity of void space gas flows from vessel A into vessel B, or when the pressure in vessels A and B is substantially equal, the first depressurization step is terminated and evacuation of vessel A is begun.

Evacuation of vessel A is effected by closing valves 8, 20, 24 and 36 and opening valves 18 and 32. Valve 30 is maintained in the open position. Pump 10 now draws gas from vessel A and pumps it into desorbed gas discharge line 14. As this step proceeds the strongly adsorbed component is desorbed from the adsorbent and removed from vessel A. The desorbed gas is transferred downstream and stored or further treated, or otherwise disposed of. When the desired degree of bed regeneration is effected, evacuation of vessel A is terminated and repressurization of vessel A is begun.

Partial repressurization of vessel A is accomplished by opening valve 36 and closing valve 32. Valve 30 remains open, and, in this embodiment, valves 8 and 24 are opened. Void space gas now flows from vessel B into vessel A to partially pressurize vessel A. During this step fresh feed gas can be pumped into vessel C to further increase its pressure. When the partial pressurization step is completed, for example when the pressure in vessels A and B is equalized, this step is terminated and the cycle is completed by pressurizing vessel A to the desired adsorption pressure with feed gas. This is accomplished by closing valves 30 and 36 and opening valve 20 and activating pump 10. The cycle is continually repeated.

In a modification of the above embodiment, vessel C is eliminated and pump 10 is idled during the first depressurization and partial repressurization steps, or pump 10 is permitted to recirculate feed gas back to the feed source by means of a bypass line (not shown).

In a more preferred embodiment of the invention, one or both of the first depressurization and the partial repressurization of vessel A are assisted by pump 10. In this embodiment, pump 10 can be continuously used throughout the adsorption cycle, and vessel C is optional. At the beginning of the feed pressurization step of this embodiment, valves 8 and 20 (and optionally valve 24) are open and all other valves are closed. Feed gas drawn through line 6 by operation of pump 10 is charged into vessel A via lines 16 and 26 (and reservoir C if valve 24 is open). When the pressure in vessel A reaches the desired adsorption pressure, valve 44 is opened and feed gas flows through the bed of adsorbent in vessel A. This step is continued in the same manner as the first step of the first embodiment. When the adsorbed gas front reaches the above-noted predetermined point in vessel A, the adsorption step is terminated and the first depressurization of vessel A is begun.

The first depressurization may be carried out as a single step or it may be carried out in two steps. In the single step aspect, valves 30, 32 and 40 are opened and all other valves are closed. Void space gas is drawn from vessel A by the action of pump 10, and this gas is pumped into vessel B via lines 12, 38 and 34. This step is continued until the pressure in vessel A is drawn down to the desired value, which is generally at or above atmospheric pressure. This step is then terminated.

As an alternative to the single step aspect, the first depressurization can be carried out as a two-step operation by first permitting void space gas to flow directly from vessel A into vessel B until pressure equalization is reached, and then completing the first depressurization with the aid of pump 10, in the manner described above. The first step is accomplished by opening valves 30 and 36 and keeping all other valves closed. Gas flows from vessel A to vessel B by virtue of the pressure differential between these vessels. During this step pump 10, which is not otherwise in use, can be used to charge feed gas into vessel C, if desired. When the first step is completed, valve 40 is kept open, valve 36 is closed and valve 32 is opened. Pump 10 is now used to pump additional void space gas from vessel A to vessel B. This step is continued until vessel A is depressurized to the desired extent, which completes the first depressurization step.

Upon completion of the first depressurization, valve 40 is closed and bed regeneration is carried out by evacuating vessel A using pump 10, in the manner described above. When the desired degree of bed regeneration is effected, evacuation of vessel A is terminated and the first repressurization step of the process is begun.

In this embodiment, partial repressurization of vessel A is accomplished by either a one-step or a two-step procedure. In the one step procedure, valves 20, 32, 36, and 40 are open, all other valves are closed, and pump 10 is activated. Void space gas is now drawn from vessel B through lines 34, 28 and 6 and pumped into vessel A through lines 12, 16 and 26. This step is continued until the desired quantity of void space gas is transferred from vessel B to vessel A, which point is usually reached when the pressure in vessel B is reduced to atmospheric pressure. The first repressurization step is then terminated.

Alternatively partial pressurization of vessel A can be accomplished by a two-step procedure. In the first step of the two-step procedure, valves 30 and 36 are opened and void space gas is caused to flow from vessel B to vessel A by virtue of the difference in pressure in the two vessels. During this step pump 10, which is otherwise idle, can be used to further charge feed gas into reservoir C, if desired. Upon completion of this step, which usually occurs when pressure equalization between vessels A and B is attained, valve 30 is closed, valves 20 and 32 are opened and pump 10 is activated; and additional void space gas is pumped from vessel B into vessel A. This step is terminated when the pressure in vessel B drops to the desired pressure, which, as noted above, is generally about atmospheric pressure. Upon completion of the partial pressurization step, the adsorption cycle is completed. The next cycle is begun by pressurizing vessel A to the desired adsorption pressure by pumping feed gas into the vessel. The cycle is continually repeated.

It can be appreciated that, where appropriate, the adsorption cycle may contain steps other than the fundamental steps of adsorption and regeneration. For example, it may sometimes be advantageous to cocurrently purge the adsorption vessel with desorbed gas product at adsorption pressure prior to the first depressurization step, or to countercurrently purge the adsorption vessel with nonadsorbed gas.

A major advantage of the invention is that impurity-containing void space gas never passes out of the adsorption vessel through the nonadsorbed gas outlet. Therefore there is little risk of polluting the nonadsorbed gas stream with impurity-containing process gas. This is not the case with currently available systems that withdraw void space gas from the nonadsorbed gas outlet end of the vessel.

The invention is particularly useful for purifying impurity-containing gases that are produced intermittently, e.g. in a batch process, or which are produced in such small volumes that they can be purified by the intermittent process of the invention. The process of the invention can be used to remove small amounts of environmentally unacceptable gases, i.e. gases that cannot be lawfully discharged into the environment, from gas streams that are to be disposed of by release to the atmosphere.

The invention is ideal for removing environmentally harmful impurity gases that cannot be easily destroyed or converted to environmentally safe compounds. For example, the process can be used to remove perfluorocarbons, such as perfluoromethane and perfluoroethane from permanent gases, such as nitrogen, oxygen, argon, hydrogen and carbon monoxide, by use of selected microporous adsorbents, as disclosed in U. S. Pat. No. 5,417,742, mentioned above, the specification of which is incorporated herein by reference.

The particular adsorbent used in the process will depend upon the gas system, including the impurity gas, or gases being removed and the gas from which the impurities are removed. Those skilled in the art can easily determine which adsorbents are suitable for any particular gas separation.

Likewise, the adsorption conditions employed, e.g. adsorption and regeneration temperatures and pressures, will depend upon the particular gas separation being performed. As noted above, the adsorption pressure typically varies from just above atmospheric pressure to about 20 bara or higher, and the bed regeneration pressure can range from pressures above atmospheric, e.g. up to about 5 bara, or higher, to vacuum pressures, i,e. pressures as low as 0.05 bara, or less. Preferred pressure ranges for these steps are indicated above.

It will be appreciated that it is within the scope of the present invention to utilize conventional equipment to monitor and automatically regulate the flow of gases within the system so that it can be fully automated to run continuously in an efficient manner.

As a specific example of the invention, a gas mixture comprising about 3% by volume hexafluoroethane and the remainder nitrogen can be separated by the process of the invention by using an adsorbent, such as Degussa Wessalith dealuminated type Y zeolite by passing the gas mixture through the adsorbent at a temperature in the range of about 5° to about 25° C. at an adsorption pressure of about 3 to about 4 bara, and desorbing the adsorbent to a pressure of about 100 mbara using the equipment and method described above. Typically, 90% or more of the hexafluoroethane can be recovered from the nitrogen.

As another specific example of the invention, an off-gas from a semiconductor processing plant containing trace amounts of various gases, such as phosphine, silane, nitrogen trifluoride, perfluoroethane, etc., can be first treated to remove all but the perfluoroethane in a system such as a water scrubber, to wash water-soluble components from the gas stream and/or a gas reactor column, to convert certain of the trace gases to stable inert inorganic solid materials. The partially purified off-gas, which still contains the perfluoroethane, which is not altered in the gas reactor column, can then be sent to the above-described single vessel adsorption system for recovery of the perfluoroethane. The desorbed product from the adsorption system can then be sent to second adsorption system that is similar to the first adsorption system, to further concentrate the perfluoroethane. The second adsorption system can be smaller, since the volume of the desorbed gas is considerably smaller than the volume of the original gas stream. The concentrated perfluoroethane gas mixture can next be treated in a cryogenic condensation unit to further purify the perfluoroethane.

Although the invention has been described with particular reference to specific equipment arrangements, these features are merely exemplary of the invention and variations are contemplated. For example, vertical or horizontal vessels can be used in any of the embodiments of the invention. Furthermore, other gas purification procedures, such as distillation, membrane separation and chemisorption can be combined with the process of the invention. The scope of the invention is limited only by the breadth of the appended claims.

What is claimed is:

1. A pressure swing adsorption process for the recovery of at least one gaseous impurity from a gas stream comprising repeatedly performing in sequence the steps:

(a) cocurrently charging said gas stream at a superatmospheric adsorption pressure into a single adsorption vessel containing an adsorbent which selectively adsorbs said at least one gaseous impurity, thereby adsorbing said at least one gaseous impurity, while cocurrently discharging from said single adsorption vessel a nonadsorbed gas stream depleted in said at least one gas impurity;

(b) partially countercurrently depressurizing said single adsorption vessel, thereby discharging gas therefrom, and collecting the discharged gas in a gas storage vessel;

(c) further countercurrently depressurizing said single adsorption vessel, thereby discharging therefrom a gas product enriched in said at least one gaseous impurity;

(d) partially pressurizing said single adsorption vessel by cocurrently charging thereinto gas from said gas storage vessel; and (e) further pressurizing said single adsorption vessel to said superatmospheric adsorption pressure by cocurrently charging said gas stream thereinto.

2. The process of claim 1, wherein step (b) is at least partly carried out by pumping gas from said adsorption vessel to said gas storage vessel.

3. The process of claim 2, wherein step (b) is carried out until the pressure in said adsorption vessel is reduced to about 1 to about 3 bara.

4. The process of claim 1, claim 2, or claim 3, wherein step (d) is at least partly carried out by pumping gas from said gas storage vessel to said adsorption vessel.

5. The process of claim 4, wherein steps (a) to (e) are carried out using a single pump means.

6. The process of claim 4, wherein step (c) is carried out by countercurrently evacuating said single adsorption vessel to subatmospheric pressure.

7. The process of claim 4, wherein step (d) is carried out by first permitting gas to flow from said gas storage vessel to said adsorption vessel without the aid of a pump until the pressure in these vessels is about equal, and then pumping additional gas from said gas storage vessel to said adsorption vessel.

8. The process of claim 1, claim 2 or claim 3, wherein step (c) is carried out by countercurrently evacuating said single adsorption vessel to subatmospheric pressure.

9. The process of claim 8, wherein said subatmospheric pressure is in the range of about 0.05 to about 0.8 bara.

10. The process of claim 9, wherein said superatmospheric pressure is in the range of about 1.5 to about 5 bara.

11. The process of claim 8, wherein said subatmospheric pressure is in the range of about 0.1 to about 0.3 bara.

12. The process of claim 2 or claim 3, wherein steps (a), (b), (c) and (e) are carried out using a single pump means.

13. The process of claim 3, wherein said step (b) is carried out by first permitting gas to flow from said adsorption vessel to said gas storage vessel without the aid of a pump until the pressure in these vessels is about equal, and then pumping additional gas from said adsorption vessel to said gas storage vessel.

14. The process of claim 1, wherein steps (a), (c) and (e) are carried out using a single pump means.

15. The process of claim 14, wherein said single pump means is used to charge feed gas into a fed gas reservoir during at least part of step (b).

16. The process of claim 14, wherein said single pump means is used to charge ted gas into a fed gas reservoir during at least part of step (d).

17. The process of claim 1, wherein said adsorption pressure is in the range of about 1.1 to about 20 bara.

18. The process of claim 1, further comprising, prior to step (a) passing the gas stream through a gas reactor column to remove components that are chemically reactable.

19. The process of claim 1 or claim 18, further comprising prior to step (a) passing the gas stream through a solvent scrubber to remove components that are soluble or dispersible in the solvent.

20. The process of claim 1, further comprising, subsequent to step (c), further purifying said at least one gaseous impurity by subjecting said gas product enriched in said at least one gaseous impurity to cryogenic condensation.

21. Apparatus for separating a strongly adsorbed gas from a gas mixture comprising:
   (a) an adsorption vessel containing an adsorbent which selectively adsorbs said strongly adsorbed gas from said gas mixture and having a feed gas inlet end and a nonadsorbed gas outlet end;
   (b) a gas storage vessel;
   (c) pump means adaptable for charging feed gas into said adsorption vessel and for evacuating gas from said adsorption vessel;
   (d) first conduit means connecting the inlet end of said adsorption vessel with said gas storage vessel;
   (e) second conduit means connecting the inlet end of said pump means with a source of feed gas and the inlet end of said adsorption vessel;
   (f) Third conduit means connecting the outlet end of said pump means with the inlet end of said adsorption vessel and strongly adsorbed component discharge conduit means;
   (g) fourth conduit means connecting the nonadsorbed gas outlet end of said adsorption vessel with a nonadsorbed gas discharge conduit means;
   (h) valve means associated with said first conduit means for controlling the flow of gas between said adsorption vessel and said void space gas storage vessel;
   (i) valve means associated with said second conduit means for selectively providing communication between said source of feed gas and said inlet end of said pump means or between said inlet end of said adsorption vessel and said inlet end of said pump means; and
   (j) valve means associated with said third conduit means for selectively providing communication between said outlet end of said pump means and said inlet end of said adsorption vessel or between said inlet end of said pump means and said strongly adsorbed component discharge conduit means; and
   (k) valve means associated with said fourth conduit means for controlling the flow of gas between the nonadsorbed gas outlet end of said adsorption vessel and said nonadsorbed gas discharge conduit means.

22. The apparatus of claim 21, wherein the outlet end of said pump means is joined to said gas storage vessel by means of a conduit which contains a valve.

23. The apparatus of claim 21, wherein said third conduit means includes a feed gas buffer vessel.

* * * * *